United States Patent
Lin et al.

(10) Patent No.: US 9,815,161 B2
(45) Date of Patent: Nov. 14, 2017

(54) BACKLASH AUTOMATIC DETECTION SYSTEM FOR MACHINE TOOL AND METHOD USING THE SAME

(71) Applicant: INDUSTRIAL TECHNOLOGY RESEARCH INSTITUTE, Hsinchu (TW)

(72) Inventors: Yi-Ying Lin, Taichung (TW); Shih-Je Shiu, Huwei Township, Yunlin County (TW); Che-Wei Hsu, Taichung (TW); Po-Hsun Wu, Taichung (TW); Chien-Yi Lee, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 389 days.

(21) Appl. No.: 14/583,420

(22) Filed: Dec. 26, 2014

(65) Prior Publication Data
US 2016/0129539 A1 May 12, 2016

(30) Foreign Application Priority Data
Nov. 12, 2014 (TW) .............................. 103139198 A

(51) Int. Cl.
*G06F 19/00* (2011.01)
*B23Q 5/56* (2006.01)
(Continued)

(52) U.S. Cl.
CPC .................. *B23Q 5/56* (2013.01); *B23Q 5/40* (2013.01); *G05B 19/404* (2013.01);
(Continued)

(58) Field of Classification Search
CPC ...... G05B 2219/41059; G05B 19/0428; G05B 19/404; G05B 2219/40381;
(Continued)

(56) References Cited

U.S. PATENT DOCUMENTS 5,609,058 A 3/1997 Gnadt et al.
2003/0205984 A1* 11/2003 Yoshida ............... G05B 19/404
318/801
(Continued)

FOREIGN PATENT DOCUMENTS

TW M342227 U 10/2008
TW 451537 4/2013
TW 201435529 A 9/2014

OTHER PUBLICATIONS

Chang-Yuan Hu, "Transmission reverse backlash measurement and compensation for CNC machine", Source: http://www.lwlm.com (http://www.lwlm.com/jixiegongchenglunwen/201203/638673.htm), Mar. 2012, 4 pages.

*Primary Examiner* — Thomas Lee
*Assistant Examiner* — Zhipeng Wang
(74) *Attorney, Agent, or Firm* — Muncy, Geissler, Olds & Lowe, P.C.

(57) ABSTRACT

A backlash automatic detection system comprises a control device and a machine tool. The machine tool comprises a servo driver, a lead screw, a nut seat and a platform. The method comprises: entering an initial state and outputting a control command to the servo driver through the control device; driving the lead screw by the servo driver to move the nut seat towards a first direction and changing the movement direction of the nut seat towards a reverse second direction by the servo driver; defining a backlash phenomenon period according to one time point at which the nut seat starts to move towards the second direction and another time point at which the platform is driven to move by the nut seat; defining the displacement of the nut seat corresponding to the backlash phenomenon period as a backlash value.

16 Claims, 5 Drawing Sheets

(51) Int. Cl.
 *B23Q 5/40* (2006.01)
 *G05B 19/404* (2006.01)
(52) U.S. Cl.
 CPC .............. *G05B 2219/41032* (2013.01); *G05B 2219/41059* (2013.01); *G05B 2219/41077* (2013.01)
(58) Field of Classification Search
 CPC ........... G05B 2219/41032; G05B 2219/41077; G05B 2219/41265; B23Q 5/40; B23Q 5/56; B23Q 23/00; B25J 9/1641; F02D 2250/16; F16H 57/12; Y10T 74/19623
 See application file for complete search history.

(56) References Cited

U.S. PATENT DOCUMENTS

| | | | | |
|---|---|---|---|---|
| 2010/0194813 | A1* | 8/2010 | Kritchman | ............... B41J 29/38 347/16 |
| 2013/0025391 | A1* | 1/2013 | Magnusson | ............. B41J 11/42 74/409 |
| 2013/0173045 | A1* | 7/2013 | Kawana | ............... G05B 19/404 700/186 |
| 2014/0062378 | A1* | 3/2014 | Iwashita | .............. G05B 19/404 318/630 |
| 2014/0197773 | A1* | 7/2014 | Ikai | ...................... G05B 19/404 318/630 |
| 2014/0290084 | A1* | 10/2014 | Revach | ................. G01B 21/02 33/701 |

* cited by examiner

BACKLASH AUTOMATIC DETECTION SYSTEM FOR MACHINE TOOL AND METHOD USING THE SAME

This application claims the benefit of Taiwan application Serial No. 103139198, filed Nov. 12, 2014, the subject matter of which is incorporated herein by reference.

TECHNICAL FIELD

The disclosure relates in general to a backlash automatic detection system and a method used in the same, and more particularly to a backlash automatic detection system and a method used in the same capable of detecting backlash values existing in the mechanism by using application program with reference to speed changes under a reciprocating movement instead of using a conventional laser interferometer.

BACKGROUND

The machine tool is a power machinery manufacturing unit mainly used for cutting metal or used in relevant manufacturing and processing of metal parts. In terms of the field of application, the machine tool can be divided into different types, such as formation, cutting and connection. To put it in greater details, the machine tools comprise lathes, milling machines, grinders, drill. Since the machine tool is mainly used for processing metals, the mechanical design of the machine tool is mainly for processing an object (also referred as a workpiece) by using a processing tool (also referred as a cutting tool) by generating relative movement between the processing tool and the workpiece. For example, the cutting tool can perform a reciprocating movement in the direction along the central axis of the workpiece. The reciprocating movement comprises a forward stroke and a return stroke. The processing operation disclosed above can be performed in the forward stroke, but the cutting tool and the workpiece are separated from each other in the return stroke.

With the continual advance and improvement in the automated production technology, the design of the machine tool is also directed towards automatic control and computer control, such that the manufacturing and processing operation with high precision can be achieved. However, the operation of ordinary machine tool still has many errors such as poor precision of the parts and poor transmission of the mechanical force. The performance of the processing operation will be affected if these errors are not corrected through the adjustment and compensation of parameters.

Referring to FIG. 1, a structural diagram of partial components of a machine tool 10 is shown. As indicated in FIG. 1, the machine tool 10 comprises a platform 11, a lead screw 12, a decoder 121, a servo driver 122 and a nut seat 13. The nut seat 13 is mounted on the lead screw 12 and together forms a ball screw. That is, the lead screw 12 can be controlled through the movement of the decoder 121 and driven by the servo driver 122 to generate rotation which further drives the nut seat 13 to be displaced towards a first direction D1 or a second direction D2.

In respect of the processing process, the first direction D1 can be a return stroke and the second direction D2 can be a forward stroke, that is, the two directions are opposite to each other. Next, a bearing groove 131 of the nut seat 13 has a gap B1, and a bearing column 111 of the platform 11 is movably disposed inside the bearing groove 131. That is, the bearing column 111, movable inside the bearing groove 131, can contact the bearing groove 131 to be driven by the bearing groove 131, such that the platform 11 disposed on the bearing column 111 can be moved in response to the displacement of the nut seat 13 disposed under the bearing groove 131.

As disclosed above, the gap B1 of the bearing groove 131 is a backlash. As indicated in FIG. 1, the bearing column 111 is located at the center of the bearing groove 131, and the distance from the bearing column 111 to one side of the bearing groove 131 can be regarded as a backlash error. An actual statistical result shows that as the movement speed increases, the backlash error will decrease and approach to a fixed value; as the movement speed decreases, the backlash error will increase.

To put it in greater details, due to the relative sliding between the platform 11 and the nut seat 13, the platform 11 (comprises the bearing column 111) will generate friction of motion, the lead screw 12 will generate flexible balance of transmission, and the bearing column 111 will cause abrasion on the bearing groove 131 in the long term. These factors will eventually change the gap B1. Moreover, during the processing operation, if accurate information of the gap B1 is lacking, relevant calculation of compensation will be biased. Therefore, periodical detection and correction of the positioning precision of the mechanism has become a necessary procedure of maintenance to avoid the processing error of the platform 11.

High production efficiency is demanded in the industry of precision machinery manufacturing. Therefore, how to detect the backlash error within a shortest time to increase positioning precision has always been a prominent task for the industry. Currently, the backlash error of the machine tool is normally detected by using a detector such as a laser interferometer. Such detection method not only increases equipment cost but also incur a large amount of time and labor in the installation, testing and uninstallation during the detection operation.

Therefore, how to effectively, correctly and automatically detect the backlash error without increasing manufacturing cost and wasting time and labor has become an important direction of development for the present disclosure.

SUMMARY

According to one embodiment of the present disclosure, a backlash automatic detection method used in a backlash automatic detection system is disclosed. The system comprises a control device and a machine tool. The machine tool comprises a servo driver, a lead screw, a nut seat and a platform. The method comprises steps of: entering an initial state and outputting a control command to the servo driver through the control device; driving the lead screw by the servo driver to move the nut seat towards a first direction and changing the movement direction of the nut seat towards a reverse second direction by the servo driver; defining a backlash phenomenon period according to one time point at which the nut seat starts to move towards the second direction and another time point at which the platform is driven to move by the nut seat; defining the displacement of the nut seat corresponding to the backlash phenomenon period as a backlash value.

According to another embodiment of the present disclosure, a backlash automatic detection system comprising a control device and a machine tool is disclosed. The control device outputs a control command in an initial state. The machine tool is connected to the control device via signals to be controlled by the control device. The machine tool further comprises a servo driver, a lead screw, a nut seat and a platform. The servo driver receives a control command. The lead screw is driven by the servo driver. The nut seat is mounted on the lead screw and driven by the lead screw to move towards a first direction or a second direction. The platform is disposed on the nut seat. Under the control of the control command, the nut seat firstly is moved towards the first direction and then is changed to move towards the reversed second direction. The control device is defined a backlash phenomenon period according to one time point at which the nut seat is started to move towards the second direction and another time point at which the platform is driven to move by the nut seat, and is further defined the displacement of the nut seat corresponding to the backlash phenomenon period as a backlash value.

Figure 1:
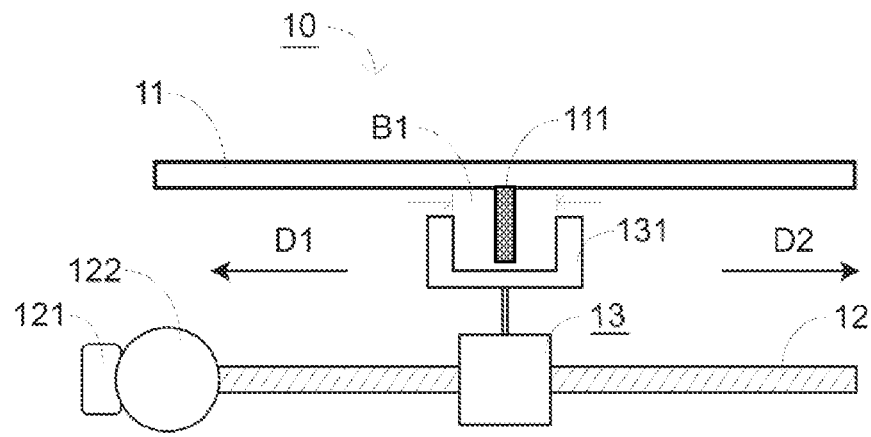
FIG. 1 shows a structural diagram of partial components of a machine tool 10.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below with accompanying drawings for elaborating the disclosure. The embodiments are for explanatory and exemplary purposes only, not for limiting the scope of protection of the present disclosure. Moreover, secondary components of the drawings are omitted in the embodiments to clearly illustrate technical characteristics of the present disclosure.

The backlash automatic detection system and the method used in the same disclosed in the present disclosure are exemplified in an exemplary embodiment below.

Figure 2:
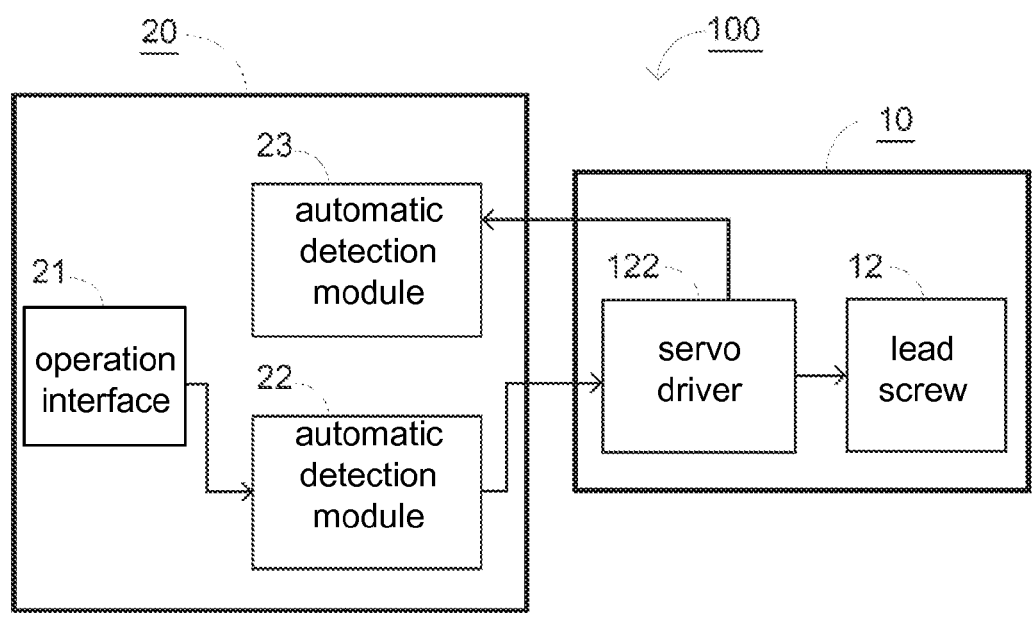
FIG. 2 shows a functional block diagram of a backlash automatic detection system 100 disclosed in an exemplary embodiment of the present disclosure.

Referring to FIG. 2, a functional block diagram of a backlash automatic detection system 100 disclosed in an exemplary embodiment of the present disclosure is shown. As indicated in FIG. 2, the backlash automatic detection system 100 mainly comprises a control device 20 and a machine tool 10. The control device 20 which controls the machine tool 10 is an industrial computer device. The machine tool 10 is connected to the control device 20 via signals to be controlled by the control device 20. It should be noted that the design of the machine tool 10 of the present disclosure is the same as that of the prior art. That is, the machine tool 10 mainly comprises a servo driver 122, a lead screw 12, a nut seat 13 and a platform 11 as indicated in FIG. 1.

The application programs used in the backlash automatic detection method of in the present disclosure are loaded on the control device 20 and executed by the same, and there is no need to detect backlash values by using any detectors such as a laser interferometer. By using existing detection function and feedback function of relevant components of the control device 20 and the machine tool 10, the backlash automatic detection method of the present disclosure is capable of performing detection, determination and computation to obtain required backlash values.

To put it in greater details, the control device 20 mainly comprises an operation interface 21, an automatic detection module 22 and a backlash detection module 23. The operation interface 21, which is operated by the user for controlling the machine tool 10, may comprise such as an input keyboard, a display screen or a touch display unit for inputting relevant commands and monitoring received information. The automatic detection module 22 generates a relevant command in response to the user's operation and further outputs the command to the servo driver 122. The said command is for setting such as movement direction or movement speed on the nut seat 13 or the platform 11. The servo driver 122 receives the command to drive the lead screw 12.

As disclosed above, according to current technology, the drive (such as rotation speed) performed on the lead screw 12 by the servo driver 122 is already known during the operation. However, in order to understand the discrepancy between actual drive and predetermined drive, the servo driver 122 can monitor the actual movement speed and the reached position of the nut seat 13, and further transmit the detection result to the backlash detection module 23. Therefore, the present disclosure completes the detection of backlash through continual feedback of the actual state of the servo driver 122.

Figure 3A:
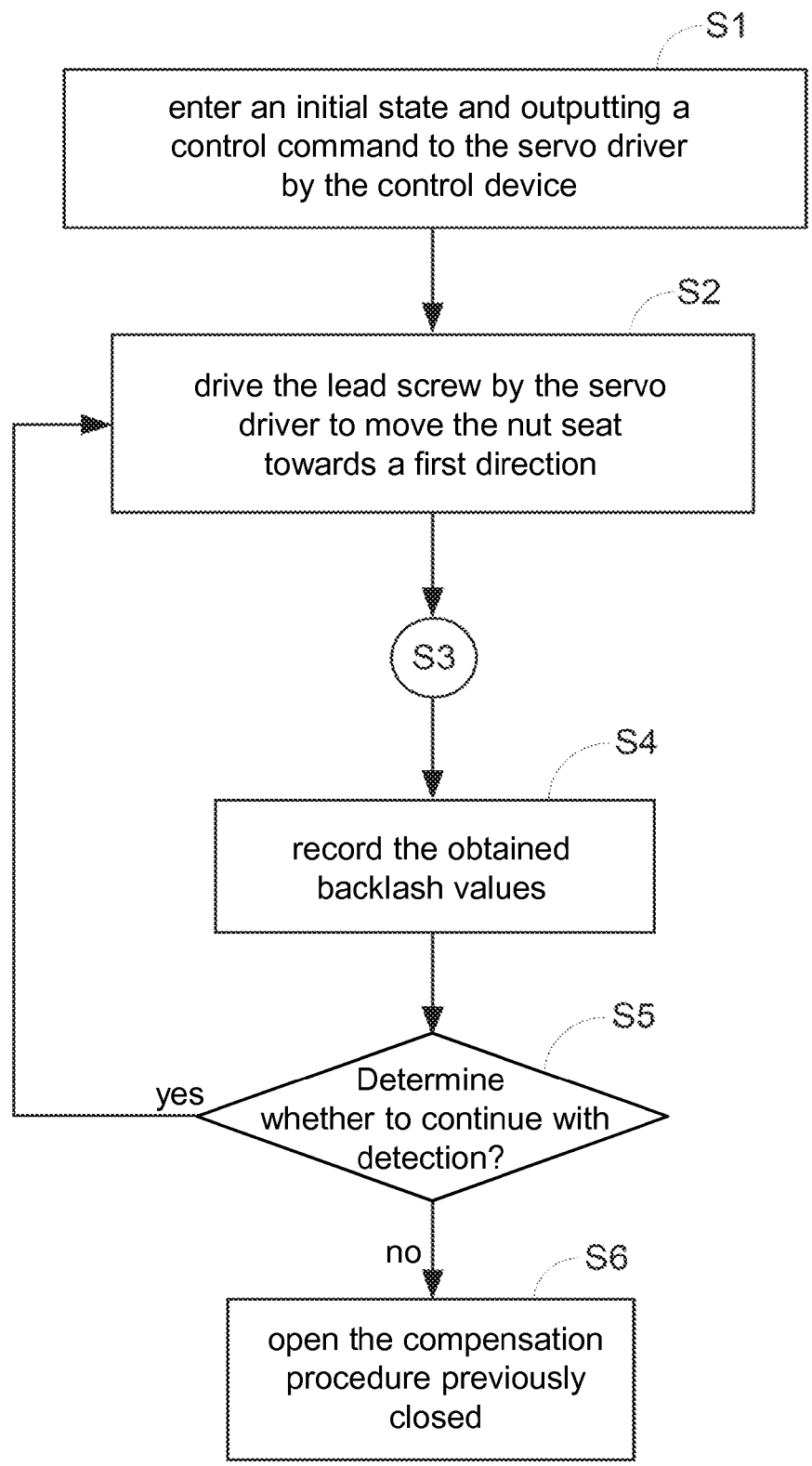
FIG. 3A and FIG. 3B show flowcharts of the backlash automatic detection method according to an exemplary embodiment of the present disclosure.
Figure 3B:
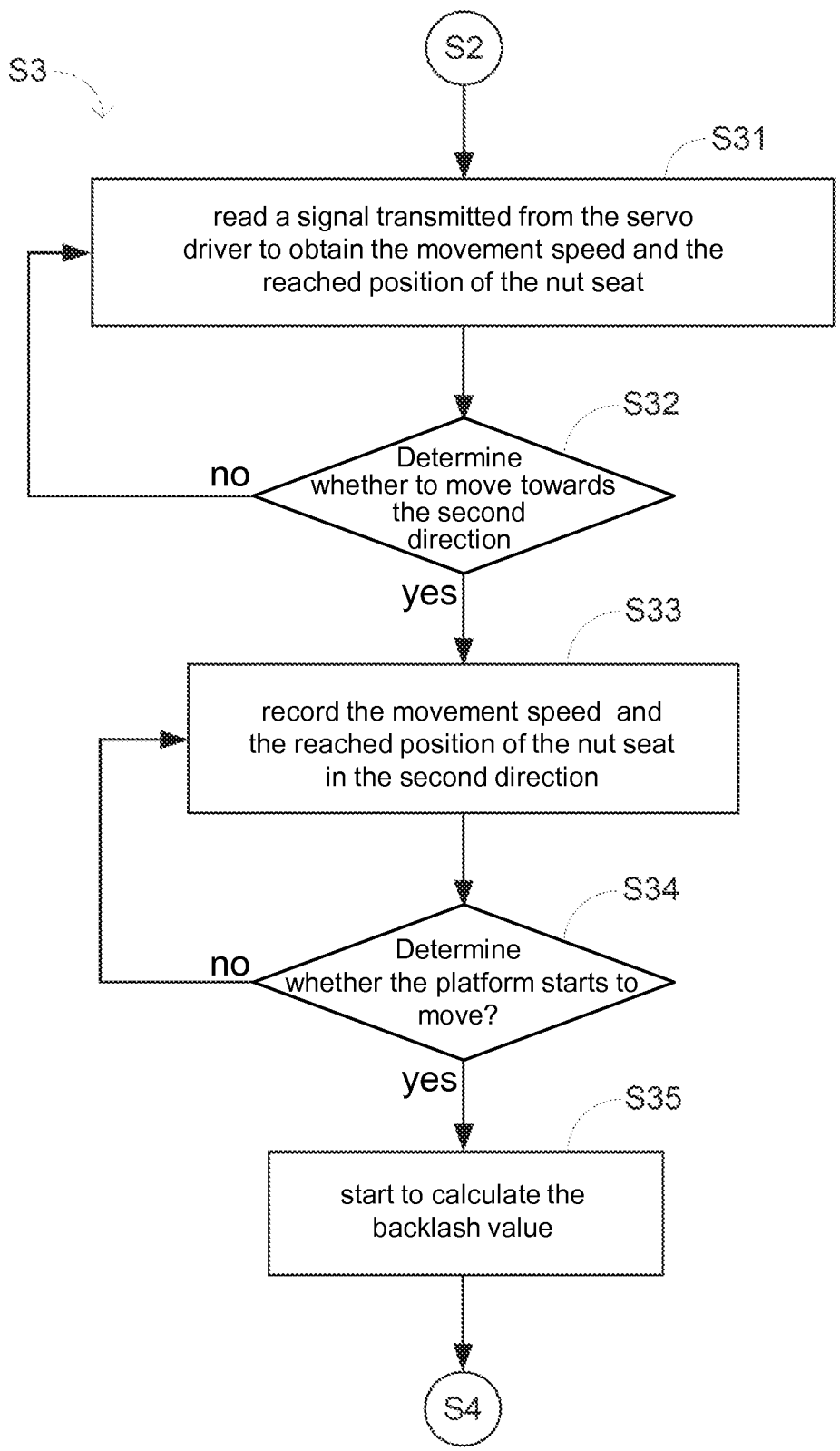
Figure 4A:
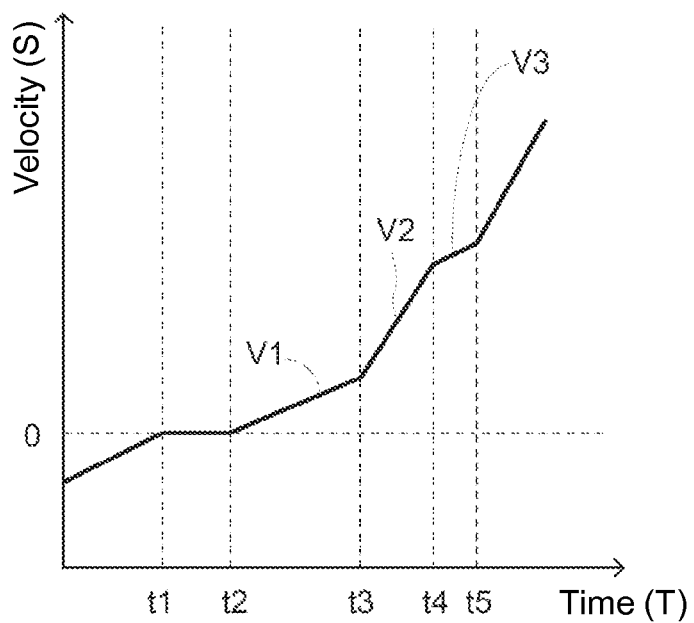
FIG. 4A shows a relationship diagram between movement speed and time.
Figure 4B:
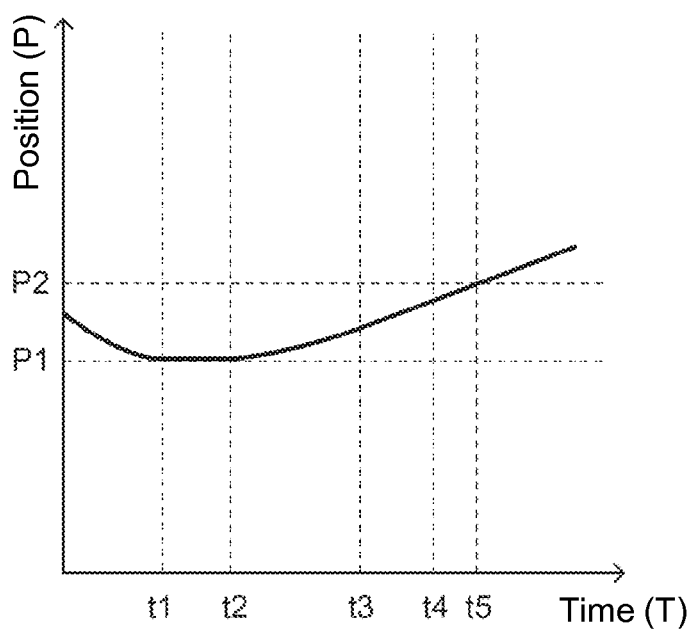
FIG. 4B shows a relationship diagram between space positions and time.
Figure 5A:
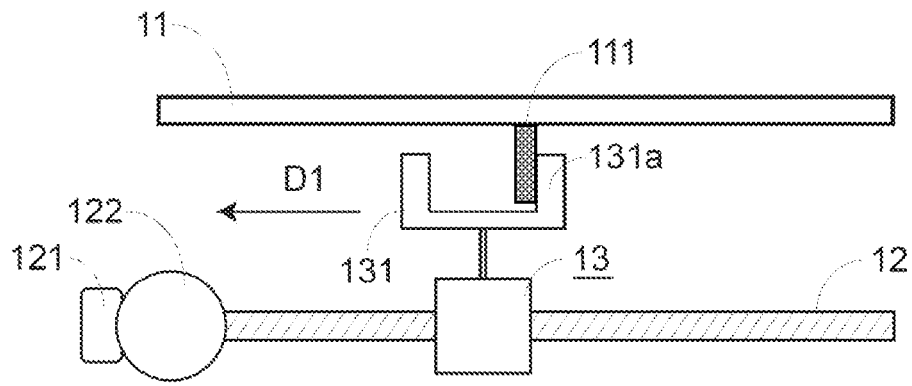
FIG. 5A to FIG. 5C show diagrams of relative positions between the bearing column 111 and the bearing groove 131 during the process of movement.
Figure 5B:
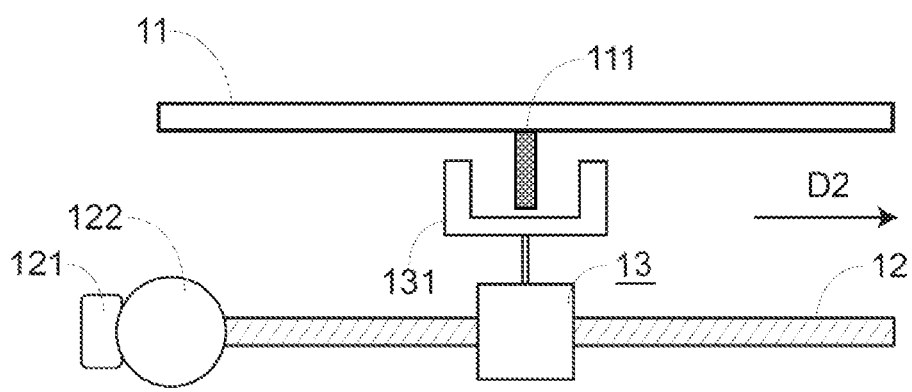
Figure 5C:
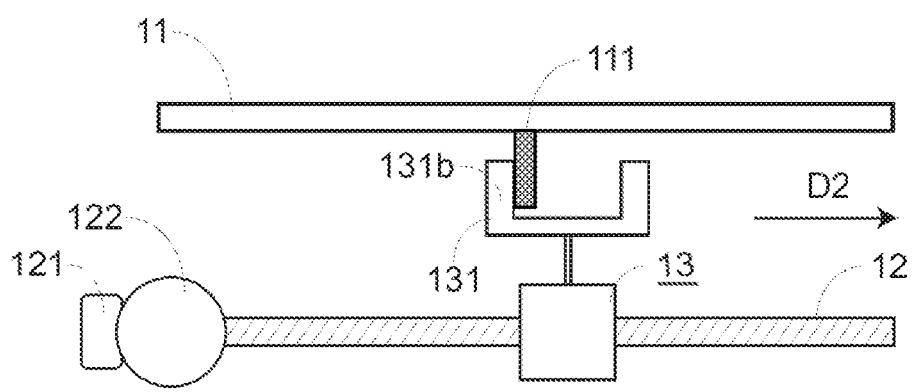

Referring to FIG. 3A and FIG. 3B, flowcharts of the backlash automatic detection method according to an exemplary embodiment of the present disclosure are shown. Referring to FIG. 4A and FIG. 4B, relationship diagrams of movement state are shown. Referring to FIG. 5A to FIG. 5C, diagrams of relative positions between the bearing column 111 and the bearing groove 131 during the process of movement are shown. FIG. 4A is a relationship diagram between movement speed and time. FIG. 4B is a relationship diagram between space positions and time. It should be noted that the curves of FIG. 4A and FIG. 4B indicate actual detection result; the movement is measured by detecting the nut seat 13; the integral result of integrating the speed change of FIG. 4A over time does not represent actual magnitude of displacement and only reflects how movement speed varies with the time.

Firstly, the method begins at step S1, the system enters an initial state, and a control command is outputted to the servo driver 122 by the control device 20. To put it in greater details, as disclosed in the prior art, in response to existing errors during the processing operation, existing technologies have relevant procedures of compensation, such as pitch compensation and backlash compensation, that can be executed and adjusted by the machine tool. However, for the backlash automatic detection method of the present disclosure to obtain a correct detection result, the adjustment of the above existing compensation procedures must be closed first of all. Therefore, the initial state of the present embodiment comprises closing the compensation procedure.

The initial state of the present embodiment further comprises moving the nut seat 13 to an original position. To put it in greater details, the original position refers to a mechanical reference point in the design of conventional machine tool, and before the processing operation starts, relevant units (such as the platform 11 or the nut seat 13) must return to the mechanical reference point, such that subsequent processing operation or compensation procedure can be correctly controlled. In the initial state of the backlash automatic detection method of the present disclosure, the machine tool needs to return to the mechanical reference point.

As disclosed above, the control command is generated by the automatic detection module 22 according to the user's operation on the operation interface 21. According to the design of the machine tool 10, the bearing column 111 is driven to move by the bearing groove 131 and the nut seat 13. Therefore, if the nut seat 13 only moves towards a particular direction, the bearing column 111 will not completely pass through the gap B1. The present disclosure has one characteristic, that is, the nut seat 13 moves reciprocally such that the gap B1 of the bearing groove 131 can be known by detecting the movement of the nut seat 13. Therefore, in the present embodiment, the control command comprises moving the nut seat 13 towards the first direction D1 first and then specifying a feed speed at which the nut seat 13 will move towards the second direction D2.

In step S2, the lead screw 12 is driven to move the nut seat 13 towards the first direction D1 by the servo driver 122 in response to the control command. To put it in greater details, since backlash detection is performed under a reciprocating movement, the movement permitting space on the lead screw 12 needs to be considered. Therefore, it can be designed that the nut seat 13 is moved to a specified position in the first direction D1, wherein the specified position can be specified by the user and can be used as the starting point of the reversed movement or the starting point of backlash detection. Due to the design of reciprocating movement, when the nut seat 13 moves towards the first direction D1, the nut seat 13 will halt at the specified position.

As disclosed above, the feed speed refers to the target speed that the nut seat 13 aims to achieve in the second direction D2. The feed speed has different settings in response to different requirements of the processing operation. In the present embodiment, to reduce backlash errors of the prior art (that is, the higher the movement speed, the smaller the backlash error), the feed speed can be set to be relatively higher.

As indicated in FIG. 4A and FIG. 4B, before the first time point t1, the nut seat 13 moves in the first direction D1 and gradually decelerates and eventually stops at the first time point t1 (the speed is 0). Meanwhile, relative positions between the bearing column 111 and the bearing groove 131 are indicated in FIG. 5A. That is, during the process of moving towards the first direction D1, the bearing column 111 is located at the edge of the bearing groove 131 and driven by one side 131a of the bearing groove 131. When the nut seat 13 and the bearing column 111 both stop, the bearing column 111 still contacts the side 131a of the bearing groove 131.

Since the nut seat 13 is stationery, if the servo driver 122 wants to change the nut seat 13 to move towards the second direction D2, the servo driver 122 has to overcome the static friction between the nut seat 13 and the lead screw 12. At the feed speed, as indicated in FIG. 4A and FIG. 4B, the stationary state lasts to the second time point t2. Therefore, during the period from the first time point t1 to the second time point t2, the nut seat 13 does not move in the reversed direction. As indicated in FIG. 4B, the nut seat 13 is correspondingly located at a position P1 at the second time point t2.

Details of the reversed movement of step S3 are indicated in FIG. 3B. In step S31 and step S32, the way for determining whether the nut seat 13 starts to move in a reversed direction is disclosed. As disclosed above, the servo driver 122 can concurrently detect the actual movement speed of the nut seat 13 and the reached position and further feedback the detection result. Therefore, the backlash detection module 23 can read the signals transmitted from the servo driver 122 to obtain the movement speed of the nut seat 13 and the reached position and then determine whether to start the reversed movement. For example, whether the movement halts and the lead screw 12 starts to move in a reversed direction is determined. If the nut seat 13 still does not move in the reversed direction, the method proceeds to step S31.

As disclosed above, the nut seat 13 starts to accelerate from the second time point t2. In other words, the nut seat 13 overcomes the static friction at the second time point t2 and starts to move towards the reversed direction. In step S32, when it is determined that the nut seat 13 starts to move towards the second direction D2, the method proceeds to step S33. In step S33, the backlash detection module 23 records the movement speed and the reached position of the nut seat 13 in the second direction D2 for future lookup purpose.

In the present embodiment, as indicated in FIG. 4A, the speed change of the nut seat 13 during the period from the second time point t2 to the third time point t3 is defined as a first speed change segment V1. During the first speed change segment V1, the nut seat 13 starts to move and gradually accelerates. At the third time point t3, the speed of the nut seat 13 is no longer affected by the static friction and starts to increase. As indicated in FIG. 4A, the speed change of the nut seat 13 during the period from the third time point t3 to the fourth time point t4 is defined as a second speed change segment V2. That is, the second speed change segment V2 shows acceleration in comparison to the first speed change segment V1 (the slope of line segment is increased).

As disclosed above, in the present embodiment, during the period from the second time point t2 to the fourth time point t4, relative positions between the bearing column 111 and the bearing groove 131 are indicated in FIG. 5B. That is, the bearing column 111 is positioned inside the bearing groove 131, and the platform 11 has not yet been driven by the bearing groove 131 to move towards the second direction D2.

Steps S33 and S34 elaborate the procedure of determining whether the nut seat 13 starts to drive the platform 11 to move. As disclosed above, after the bearing groove 131 moves, one side 131a of the bearing groove 131 contacts and drives the bearing column 111 to move. Therefore, when the bearing column 111 moves towards the second direction D2, the other side 131b of the bearing groove 131 (referring to FIG. 5C) will contact and drive the bearing column 111 to move. Since the load to be driven becomes heavier, the movement speed will decrease when the side 131b of the bearing groove 131 contacts the bearing column 111.

As indicated in FIG. 4A, the speed of the nut seat 13 decreases at the fourth time point t4. This indicates that the other side 131b of the bearing groove 131 of the nut seat 13 already contacts the bearing column 111. Relative positions between the bearing column 111 and the bearing groove 131 are indicated in FIG. 5C. In the present embodiment, the speed change of the nut seat 13 during the period from the fourth time point t4 to the fifth time point t5 is defined as a third speed change segment V3. That is, the third speed change segment V3 shows a deceleration in comparison to the second speed change segment V2 (the slope of line segment decreases).

To put it in greater details, although the bearing groove 131 already contacts the bearing column 111 at the fourth time point t4, the bearing column 111 still cannot immediately drive the platform 11 to move due to the increase in resistance. In step S34, whether the nut seat 13 starts to drive the platform 11 to move is determined according to whether the speed of the nut seat 13 starts to accelerate after the third speed change segment V3 (that is, the time point from which the slope starts to increase). If the speed does not increase, this indicates that the platform 11 has not yet been driven, and the method proceeds to step S33. If the speed starts to increase, this indicates that the platform 11 is already driven to move, and the method proceeds to step S35.

As indicated in FIG. 4A, the nut seat 13 starts to accelerate from the fifth time point t5 (the slope of line segment increases). That is, the nut seat 13 already overcomes static friction and starts to drive the platform 11 to move towards the second direction D2. In step S35, backlash values are calculated. Based on the above elaboration, the present disclosure has another characteristic, that is, the period from the second time point t2 to the fifth time point t5 is defined as a backlash phenomenon period. As indicated in FIG. 4B, the nut seat 13 is already correspondingly located at a position P2 at the fifth time point t5.

As disclosed above, the change in the movement speed of the nut seat 13 during the backlash phenomenon period has the three change segments. During the three change segments, the displacement of the nut seat 13 represents the amount of backlash value. Therefore, in step S35, the calculation for the displacement of the nut seat 13 corresponding to the backlash phenomenon period relates to the calculation for the distance of the nut seat 13 from position P1 to position P2, and a backlash value can be obtained from the above calculation.

Refer to step S4 of FIG. 3A. After the backlash value is obtained, the backlash value is recorded because it can be used in the compensation procedure of subsequent processing operation. At this point, the backlash automatic detection method of the present disclosure is already completed successfully. The present disclosure has another characteristic, that is, apart from performing detection once to obtain a backlash value, the present embodiment can also perform detection for several times to obtain several backlash values.

In step S5, if detection needs to be performed for several times, the method returns to step S2 to repeat the above procedures. It should be noted that when the backlash values are detected at different feed speeds (that is, the movement speed), the lower the speed, the larger the error. Also, to avoid too many factors affecting detection, the starting point of the reversed movement or the starting point of backlash detection, that is, the specified position disclosed in step S2, needs to be the same.

Thus, multiple detections can be implemented in an exemplary embodiment as follows. Firstly, the nut seat 13 is again driven to move towards the first direction D1 until the specified position is reached, and then the nut seat 13 is driven to move towards the reversed second direction D2 at the same feed speed. Then, a plurality of backlash values are obtained according to the reciprocating movement of the nut seat 13 between the first direction D1 and the second direction D2 and corresponding time points (that is, the time points at which the movement speed changes), and the backlash values is averaged to obtain a backlash average value.

The larger the number of times of detection is performed, the closer to actual backlash value (t at is, gap B1) the obtained backlash average value will be, and the smaller the error will be. In other words, in subsequent processing operation adopting the predetermined feed speed, the precision of the processing operation will be increased if the obtained backlash value or backlash average value is used in the compensation procedure. Therefore, in step S6, when detection is no longer needed, that is, the backlash detection specified by the user is already completed, and the compensation procedure which was already closed can now be opened, so that the processing operation can be performed normally.

On one hand, the processing operation of a machine tool normally needs to have different settings of feed speed in response to different objects. When detection is performed in an exemplary embodiment of the present disclosure, the control command needs to have a corresponding setting of feed speed. When the obtained backlash value is compensated in a compensation procedure, only the corresponding feed speed can be used. Therefore, the user can prepare a contrast table with respect to various backlash values obtained by using different feed speeds, and the contrast table can be used as a reference for compensation in corresponding processing operation.

To summarize, the backlash automatic detection system and the method used in the same disclosed in the present disclosure are capable of detecting backlash values existing in the mechanism by using application program instead of using a detector such as a laser interferometer, hence greatly saving the procurement cost for the equipment as well as the large amount of time and labor which would otherwise be required for testing and installing detection equipment.

Let a practical example of using the detection method of the present disclosure be taken for example. In the practical example, three machine tools are used for cross reference. The Z-axis is used as an experimental axis. The original position is 0 millimeter (mm). The specified position is −20 mm. The number of times of detection is 5; the feed speed is 2000 mm/minute. The detection results of the three machine tools are taken average. The detection method of the present disclosure only takes 12 minutes, but the convention laser detection method takes 3.5 hours. In comparison to the generally known technology, the present disclosure saves the operation time by 94%.

Also, the detection method of the present disclosure has significant improvement in respect of precision, that is, the error of obtained backlash is significantly reduced. Let the same practical example disclosed above be taken for example. The backlash average value obtained by taking average on the results obtained from 5 times of detections performed by the first machine tool is 14.6 μm, and backlash value obtained by using the conventional laser detection method is 17 μm. The backlash value obtained by taking average on the results obtained from 5 times of detections performed by the third machine tool is 13 μm, and backlash value obtained by using the conventional laser detection method is 14 μm. Therefore, the precision of the present disclosure is about 85.88%-92.85%.

Another example of using the detection method of the present disclosure is disclosed below. In the present example, five feed speeds, that is, 2000, 4000, 6000, 8000, and 10000 (mm/minute), are used for cross reference. When the feed speed is 2000 (mm/minute), the backlash value obtained by using the conventional detection method is 17 µm, and the backlash value obtained by using the detection method of the present disclosure is 18.7 µm. When the feed speed is 10000 (mm/minute), the backlash value obtained by using the conventional detection method is 14 µm, and the backlash value obtained by using the detection method of the present disclosure is 12.1 µm. Therefore, in comparison to the conventional detection method, the present disclosure significantly improves by 86-92% in respect of the precision of the processing operation.

Therefore, the present disclosure effectively resolves relevant problems encountered in prior art and successfully achieve the main objects of the present disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A backlash automatic detection method, which is used in a backlash automatic detection system wherein the backlash automatic detection system comprises a control device and a machine tool, and the machine tool comprises a servo driver, a lead screw, a nut seat and a platform, comprising the following steps:
   entering an initial state and outputting a control command to the servo driver through the control device;
   driving the lead screw by the servo driver to move the nut seat towards a first direction, and then changing the moving direction of the nut seat towards a reverse second direction by the servo driver;
   defining a backlash phenomenon period according to a time point while the nut seat is started to move towards the second direction, and another time point while the platform is driven to move by the nut seat; and
   defining the displacement of the nut seat corresponding to the backlash phenomenon period as a backlash value,
   wherein the movement speed of the nut seat during the backlash phenomenon period comprises a first speed change segment, a second speed change segment and a third speed change segment, the second speed change segment shows an acceleration in comparison to the first speed change segment, and the third speed change segment shows a deceleration in comparison to the second speed change segment, and
   wherein a sum of displacement of the nut seat during periods of the first speed change segment, the second speed change segment, and the third speed change segment is defined as the backlash value,
   wherein the machine tool provides and executes a compensation procedure based on the defined backlash value, and in the initial state, the compensation procedure is closed, and the nut seat is moved to an original position.

2. The backlash automatic detection method according to claim 1, wherein the compensation procedure is a pitch compensation or a backlash compensation.

3. The backlash automatic detection method according to claim 1, wherein the original position is a mechanical reference point of the machine tool.

4. The backlash automatic detection method according to claim 1, wherein the method comprises steps of:
   reading a signal transmitted from the servo driver to obtain the movement speed and the reached position of the nut seat;
   determining whether the nut seat is moved towards the second direction; and
   recording the movement speed and the reached position of the nut seat in the second direction when the nut seat starts to move towards the second direction.

5. The backlash automatic detection method according to claim 1, wherein the control device is connected to the machine tool via signals for controlling the machine tool, and the control device further comprises an operation interface operated by the user to generate the control command.

6. The backlash automatic detection method according to claim 5, wherein the control device is a computer device, and the operation interface is an input keyboard, a display screen or a touch display unit.

7. The backlash automatic detection method according to claim 1, wherein the control command comprises moving the nut seat towards the first direction and then specifying a feed speed at which the nut seat will move towards the second direction.

8. The backlash automatic detection method according to claim 7, wherein the method comprises steps of:
   again moving the nut seat towards the first direction to reach a specified position, and then moving the nut seat towards the reversed second direction at the same feed speed; and
   obtaining a plurality of backlash values according to the reciprocating movement of the nut seat between the first direction and the second direction and corresponding time points, and taking average of the backlash values to obtain a backlash average value.

9. A backlash automatic detection system, comprising:
   a control device for outputting a control command in an initial state; and
   a machine tool connected to the control device via signals to be controlled by the control device, wherein the machine tool further comprising:
   a servo driver for receiving the control command;
   a lead screw driven by the servo driver;
   a nut seat mounted on the lead screw and driven by the lead screw to move towards a first direction or a second direction; and
   a platform assembled on the nut seat;
   wherein under the control of the control command, the nut seat firstly is moved towards the first direction and then is changed to move towards the reversed second direction;
   the control device is defined a backlash phenomenon period according to one time point at which the nut seat is started to move towards the second direction and another time point at which the platform is driven to move by the nut seat, and is further defined the displacement of the nut seat corresponding to the backlash phenomenon period as a backlash value,
   wherein the movement speed of the nut seat during the backlash phenomenon period comprises a first speed change segment, a second speed change segment and a third speed change segment, the second speed change segment shows an acceleration in comparison to the first speed change segment, and the third speed change segment shows a deceleration in comparison to the second speed change segment, and
   wherein a sum of displacement of the nut seat during periods of the first speed change segment, the second speed change segment, and the third speed change segment is defined as the backlash value,
   wherein the machine tool provides and executes a compensation procedure based on the defined backlash value, and in the initial state, the compensation procedure is closed, and the nut seat is moved to an original position.

10. The backlash automatic detection system according to claim 9, wherein the compensation procedure is a pitch compensation or a backlash compensation.

11. The backlash automatic detection system according to claim 9, wherein the original position is a mechanical reference point of the machine tool.

12. The backlash automatic detection system according to claim 9, wherein the control device comprises:
   an operation interface operated by the user;
   an automatic detection module for generating the control command in response to the user's operation and further outputting the control command to the servo driver; and
   a backlash detection module for reading a signal transmitted from the servo driver to obtain the movement speed and the reached position of the nut seat.

13. The backlash automatic detection system according to claim 12, wherein the backlash detection module determines whether the nut seat moves towards the second direction, and records the movement speed and the reached position of the nut seat in the second direction when the nut seat starts to move towards the second direction.

14. The backlash automatic detection system according to claim 12, wherein the control device is a computer device, and the operation interface is a input keyboard, a display screen or a touch display unit.

15. The backlash automatic detection system according to claim 9, wherein the control command comprises moving the nut seat towards the first direction and then specifying a feed speed at which the nut seat will move towards the second direction.

16. The backlash automatic detection system according to claim 15, wherein under the control command, the nut seat again moves towards the first direction to reach a specified position, and then moves towards the reversed second direction at the same feed speed; the control device obtains a plurality of backlash values according to the reciprocating movement of the nut seat between the first direction and the second direction and corresponding time points, and takes average of the backlash values to obtain a backlash average value.

\* \* \* \* \*